(12) United States Patent
Sahu

(10) Patent No.: US 10,516,181 B2
(45) Date of Patent: Dec. 24, 2019

(54) APPARATUS AND METHOD ASSOCIATED WITH REFORMER-LESS FUEL CELL

(71) Applicant: Palo Alto Research Center Incorporated, Palo Alto, CA (US)

(72) Inventor: Saroj Sahu, Fremont, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 1143 days.

(21) Appl. No.: 14/472,195

(22) Filed: Aug. 28, 2014

(65) Prior Publication Data

US 2016/0064763 A1   Mar. 3, 2016

(51) Int. Cl.
| | |
|---|---|
| *H01M 8/1016* | (2016.01) |
| *H01M 4/88* | (2006.01) |
| *H01M 4/90* | (2006.01) |
| *H01M 8/1004* | (2016.01) |
| *H01M 8/1233* | (2016.01) |

(Continued)

(52) U.S. Cl.
CPC ......... *H01M 8/1016* (2013.01); *H01M 4/881* (2013.01); *H01M 4/8853* (2013.01); *H01M 4/8871* (2013.01); *H01M 4/8878* (2013.01); *H01M 4/905* (2013.01); *H01M 4/9025* (2013.01); *H01M 4/9058* (2013.01); *H01M 8/1004* (2013.01); *H01M 8/124* (2013.01); *H01M 8/1233* (2013.01); *H01M 2004/8684* (2013.01); *H01M 2004/8689* (2013.01)

(58) Field of Classification Search
None
See application file for complete search history.

(56) References Cited

U.S. PATENT DOCUMENTS 3,471,334 A   10/1969   Novack et al.
7,459,225 B2  12/2008   Apte et al.
(Continued)

FOREIGN PATENT DOCUMENTS

GB    1114431    5/1968

OTHER PUBLICATIONS

Skinner et al.; Oxygen ion conductors; ISSN:1369 7021; materialstoday, Mar. 2003; pp. 30-37.

(Continued)

*Primary Examiner* — Alix E Eggerding
(74) *Attorney, Agent, or Firm* — Fay Sharpe LLP

(57) ABSTRACT

An electrolyte membrane for a reformer-less fuel cell is provided. The electrolyte membrane is assembled with fuel and air manifolds to form the fuel cell. The fuel manifold receives an oxidizable fuel from a fuel supply in a gaseous, liquid, or slurry form. The air manifold receives air from an air supply. The electrolyte membrane conducts oxygen in an ionic superoxide form when the fuel cell is exposed to operating temperatures above the boiling point of water to electrochemically combine the oxygen with the fuel to produce electricity. The electrolyte membrane includes a porous electrically non-conductive substrate, an anode catalyst layer deposited along a fuel manifold side of the substrate, a cathode catalyst layer deposited along an air manifold side of the substrate, and an ionic liquid filling the substrate between the anode and cathode catalyst layers. Methods for manufacturing and operating the electrolyte membrane are also provided.

25 Claims, 12 Drawing Sheets

(51) Int. Cl.
*H01M 8/124* (2016.01)
*H01M 4/86* (2006.01)

(56) References Cited

U.S. PATENT DOCUMENTS

| | | |
|---|---|---|
| 7,765,949 B2 | 8/2010 | Fork et al. |
| 7,799,371 B2 | 9/2010 | Fork et al. |
| 7,811,692 B2 | 10/2010 | Apte et al. |
| 7,938,890 B2 | 5/2011 | Littau et al. |
| 7,938,891 B2 | 5/2011 | Littau |
| 7,938,892 B2 | 5/2011 | Littau |
| 8,389,165 B2 | 3/2013 | Littau |
| 2007/0160889 A1* | 7/2007 | Korin .................. C08J 5/22 429/482 |
| 2010/0221633 A1* | 9/2010 | Fujita .................. H01M 8/241 429/452 |
| 2012/0009491 A1 | 1/2012 | Friesen et al. |
| 2013/0143143 A1 | 6/2013 | Littau |

OTHER PUBLICATIONS

Ali, et al.; Deep desulphurization of gasoline and diesel fuels using non-hydrogen consuming techniques, Fuel 85 (2006) pp. 1354-1363.

Arpa; Reliable Electricity Based on Electrochemical Systems—REBELS; Jun. 19, 2014; 3 pp.

EPRI Report No. 1011496; Assessment of Direct Carbon Fuel Cells; Feb. 2005; 55 pp.

EPRI Report No. 1013362; Assessment of a Novel Direct Coal Conversion—Fuel Cell Technology for Electric Utility Markets; Dec. 2006; 81 pp.

EPRI Report No. 1016170; Program on Technology Innovation: Systems Assessment of Direct Carbon Fuel Cells Technology; Apr. 2008; 97 pp.

* cited by examiner

APPARATUS AND METHOD ASSOCIATED WITH REFORMER-LESS FUEL CELL

This invention was made with government support under Contract Number P017.2012.40 HSL-IPI-DCFuelCells awarded by the U.S. Department of Energy (DoE). The government has certain rights in this invention.

BACKGROUND

This disclosure presents various embodiments of an electrolyte membrane for a reformer-less fuel cell. The fuel cell receives an oxidizable fuel (e.g., hydrogen or a carbonaceous fuel, such as Methane) from a fuel supply at a fuel manifold and air from an air supply at an air manifold. The electrolyte membrane conducts oxygen in an ionic superoxide form when the fuel cell is exposed to operating temperatures above the boiling point of water and below 500° C. to electrochemically combine the oxygen with the fuel to produce electricity. In various embodiments, the electrolyte membrane includes a porous substrate and an ionic liquid.

Fuel cells hold a great promise for the distributed generation of electricity. Since fuel cells can operate at higher thermodynamic efficiency than simple cycle turbines, the impact on greenhouse gas reduction is significant. Local & distributed generation by fuel cell does not suffer from the 7-10% transmission loss as observed with centralized electricity generation. In addition, distributed generation offers the society resilience against natural calamities, cyber-attacks and terrorist attacks which can incapacitate central generation plants and leave large populations helpless.

There is a significant debate whether variable energy resources (VER), such as wind and solar can continue to be integrated into the main grid beyond a certain fraction of the total load, due to their unpredictability. Many energy operators have already started complaining about such unpredictability and are questioning the ability to integrate more VERs into their grid. Fuel cells as distributed generators offer an excellent alternative to such problems. While as distributed generators, fuel cells provide local power, they also pump energy into the grid on demand, thus being a balancer of loads, and would, in addition, allow more VERs to be integrated to the grid.

Almost all fuel cells work with hydrogen as a fuel, however hydrogen itself is not a natural fuel. Hydrogen is usually obtained by steam reformation of hydrocarbons. The reformation spends a significant amount of energy, resulting in a reduced net thermodynamic efficiency and higher system cost. Natural gas has been explored heavily and successfully in the United States, and is likely to be the commercial fuel of choice for several decades to come. It is therefore desirable that fuel cells run on natural gas, i.e. methane, directly as opposed to reformed Hydrogen.

There are two predominant classes of fuel cells in commercial production, proton-exchange membrane fuel cells (PEMFC) and solid-oxide fuel cells (SOFC). Both are relatively mature technologies but suffer drawbacks that have prevented their widespread use. They work in the range of 25-100 C and 700-1000 C, respectively.

PEMFCs are proton (hydrogen-ion) conducting fuel cells, whereas SOFCs are oxygen-conducting fuel cells. Therefore, while PEMFCs must use a reformer to run on natural gas, oxygen-conducting fuel cells, such as SOFCs have the potential to run on both, hydrogen and hydrocarbons, i.e. methane. With reference to FIG. 1, the ion transport in hydrogen-conducting membranes versus oxygen-conducting membranes is shown.

PEMFCs, due to the need for reformers, are economically and energetically inefficient. Since PEM membranes work only in the hydrated form, and copious amount of water is produced as a result of the reaction, water management on both the sides of the cell is a difficult issue. Other problems such as catalyst drowning and destruction of carbon support due to water starvation occur. Additionally, the presence of COx, NOx and SOx in the fuel or air stream imparts a poisoning effect on the catalysts. Therefore additional infrastructure, such as chemical scrubbing, is required to reduce or eliminate such impurities, thus reducing the economical and energy efficiency advantages.

SOFCs have the potential to use natural gas directly, because they operate at very high temperature and conduct Oxygen. However, most practical and commercial SOFCs must use a steam reformer to perform as needed. They typically use a doped Yttria-stabilized-Zirconia (YSZ) as the oxygen conducting membrane. At high temperatures (800 C on average), serious issues arise, such as (a) catalysts, e.g. Ni and NiO cannot adhere on the membrane over several thermal cycles due to a mismatch of coefficient of thermal expansion (CTE); (b) commercial plastics and commercial metals, such as aluminum and common steel cannot be used, necessitating expensive metal and ceramic structural components; (c) gas fittings and controls become inordinately expensive to operate at the high temperatures. Operating at such high temperatures includes materials reliability and safety issues.

Many fuel cells work with hydrogen as a fuel, but hydrogen does not occur naturally with high abundance. It is usually obtained by steam reformation of hydrocarbons, which is inefficient and costly. It is therefore desirable that fuel cells use natural gas (primarily methane) directly as opposed to reformed hydrogen. New types of alkaline, acidic and molten salt electrolytes are being researched. However, with these technologies, the research is in the hydrogen ion (proton) conducting electrolytes and would require the fuel supplied to an ITFC would have to be hydrogen, and a reformer would be required to generate hydrogen from methane or other carbonaceous fuels.

BRIEF DESCRIPTION

In one aspect, an apparatus associated with a reformer-less fuel cell is provided. In one embodiment, the apparatus includes an electrolyte membrane configured to be assembled with a fuel manifold and an air manifold to form a reformer-less fuel cell, wherein the fuel manifold is configured to receive an oxidizable fuel from a fuel supply in at least one of a gaseous form, a liquid form, and a slurry form, wherein the air manifold is configured to receive air from an air supply, the air comprising at least oxygen, wherein the electrolyte membrane is configured to conduct oxygen in an ionic superoxide form when the reformer-less fuel cell is exposed to operating temperatures above the boiling point of water to electrochemically combine the oxygen with the oxidizable fuel to produce electricity. In this embodiment, the electrolyte membrane includes: a porous electrically non-conductive substrate; an anode catalyst layer deposited along a fuel manifold side of the porous substrate; a cathode catalyst layer deposited along an air manifold side of the porous substrate; and an ionic liquid filling the porous substrate between the anode and cathode catalyst layers to form the electrolyte membrane.

In another aspect, a method of manufacturing an apparatus associated with a reformer-less fuel cell is provided. In one embodiment, the method includes: forming a porous substrate from electrically non-conductive particles; depositing an anode catalyst layer along a first side of the porous substrate; depositing a cathode catalyst layer along a second side of the porous substrate; and filling the porous substrate between the anode and cathode catalyst layers with an ionic liquid to form an electrolyte membrane configured to be assembled with a fuel manifold in relation to the first side of the electrolyte membrane and an air manifold in relation to the second side of the electrolyte membrane to form a reformer-less fuel cell. In this embodiment, the fuel manifold is configured to receive an oxidizable fuel from a fuel supply in at least one of a gaseous form, a liquid form, and a slurry form. In the embodiment being described, the air manifold is configured to receive air from an air supply, the air comprising at least oxygen. In this embodiment, the electrolyte membrane is configured to conduct oxygen in an ionic superoxide form when the reformer-less fuel cell is exposed to operating temperatures above the boiling point of water to electrochemically combine the oxygen with the oxidizable fuel to produce electricity.

In yet another aspect, a method of operating an apparatus associated with a reformer-less fuel cell is provided. In one embodiment, the method includes: exposing an electrolyte membrane assembled with a fuel manifold and an air manifold to form a reformer-less fuel cell to operating temperatures above the boiling point of water; supplying an oxidizable fuel to the fuel manifold from a fuel supply in at least one of a gaseous form, a liquid form, and a slurry form; supplying air to an air manifold from an air supply, the air comprising at least oxygen; and conducting oxygen in an ionic superoxide form through the electrolyte membrane to electrochemically combine the oxygen with the oxidizable fuel to produce electricity. In this embodiment, the electrolyte membrane includes a porous substrate formed by electrically non-conductive particles, an anode catalyst layer deposited along a fuel manifold side of the porous substrate, a cathode catalyst layer deposited along an air manifold side of the porous substrate, and an ionic liquid filling the porous substrate between the anode and cathode catalyst layers.

DETAILED DESCRIPTION

Figure 1:
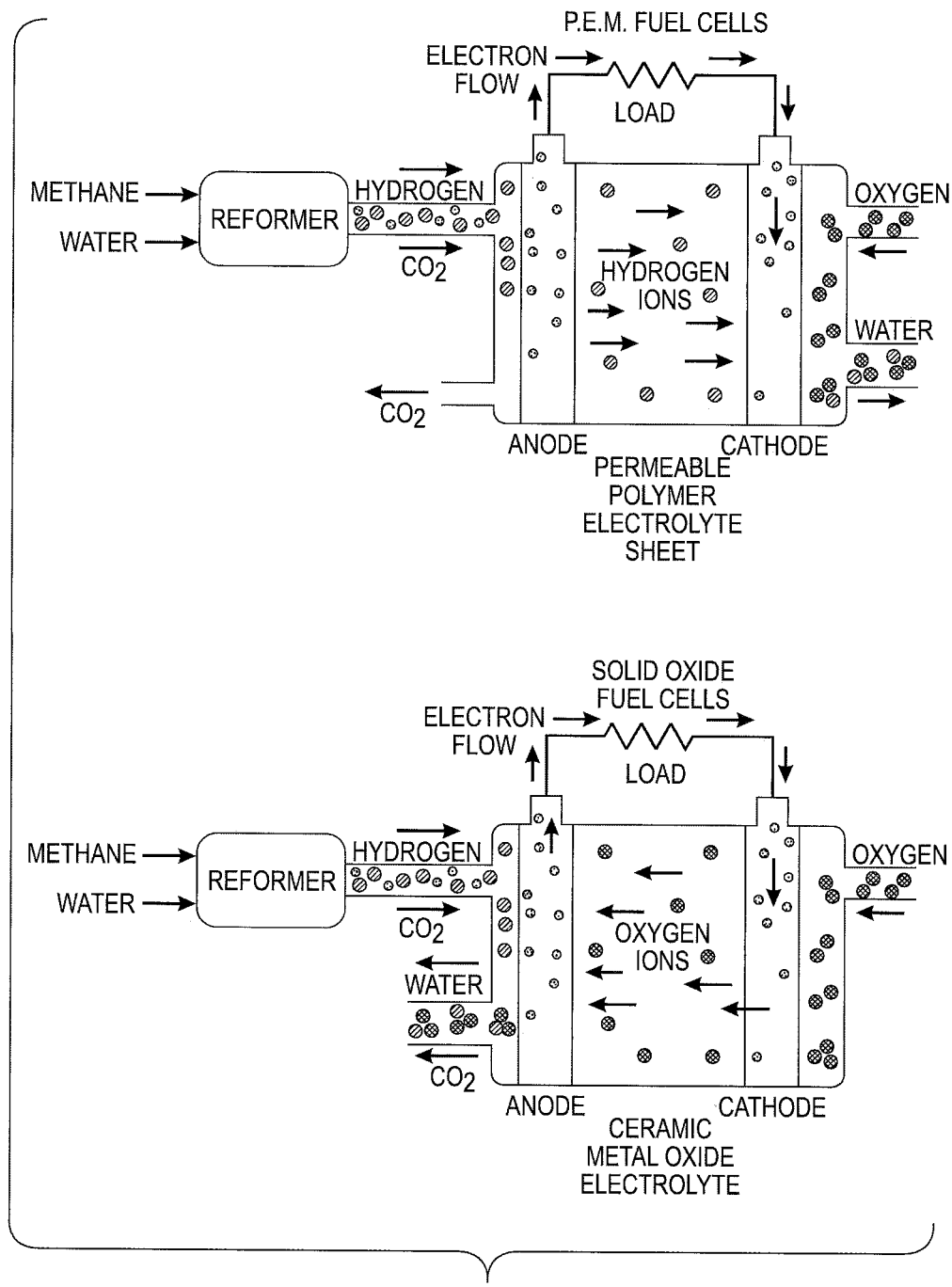
FIG. 1 depicts ion transport in hydrogen-conducting membranes versus oxygen-conducting membranes.

The disclosure provides for an electrolyte/membrane system that conducts oxygen ions in superoxide form, which results in direct oxygen transport and reaction with a wide variety of fuels, not limited to hydrogen. Fuel cells built with this technology do not require a methane-to-hydrogen reformer and operate at intermediate temperature ranges. An intermediate-temperature fuel cell is capable of utilizing a wide variety of carbon-based input fuels. The electrolyte membrane system transports oxygen in a form that allows it to react directly with almost any fuel. This membrane eliminates the need for a separate fuel processing system, reducing overall costs. The fuel cell operates at relatively low temperatures, below 500 C and preferably between 100 and 300 C, to avoid long-term durability problems associated with existing high-temperature fuel cells.

This disclosure presents various embodiments of a reformer-less fuel cell. A fuel cell capable of operating between the thermal ranges of PEMFC and SOFC is generally called an Intermediate Temperature Fuel Cell (ITFC). The ITFC operates in a temperature range of 100-500 C. The present application is directed towards fuel cells that operate at the lower end of that temperature range (100-300 C), bringing additional cost and reliability benefits.

ITFCs overcome the water-related problems in PEMFCs, since the operating temperature is above the boiling point of water. ITFCs also overcome most thermal problems associated with a SOFC, since at such lower temperature, (a) the coefficient of thermal expansion (CTE) mismatch is more manageable; (b) gas handling components are less costly than liquid; and (c) inexpensive materials such as aluminum, steel, and plastics can be used as structural components.

New types of alkaline, acidic and molten salt electrolytes are being researched. However, with these technologies, the research is in the hydrogen ion (proton) conducting electrolytes and would require the fuel supplied to an ITFC would have to be hydrogen, and a reformer would be required to generate hydrogen from methane.

The present application provides for an electrolyte/membrane system that conducts oxygen ions in superoxide form, which results in direct oxygen transport and reaction with a wide variety of fuels, not limited to hydrogen. Fuel cells built with this technology do not require a methane-to-hydrogen reformer.

The present application is directed toward a Reformer-less Oxygen-conducting Multi-fuel Intermediate-temperature fuel cell (RONIN) that is capable of electrochemically consuming a variety of complex fuels such as methane, butane, propane and coal. The present application falls into the general category of Intermediate Temperature Fuel Cells (ITFC), but no hydrogen reformation is required. The major advantage of this technology is the relatively low temperature of operation (100-300 C), which allows use of polymeric and metallic structural and sealing components, thus reducing cost and increasing reliability and life time of a resultant fuel cell system.

Ionic liquids (IL) are a new class of materials that can be tuned to exhibit a variety of electrochemical and fluidic properties. The ionic liquids exhibit ionic solubility and conduction to certain gases. A membrane based on specific ionic liquids fixated in fine porous ceramics can be used to conduct oxygen in a fuel cell. When as porous ceramic is catalyzed, such ILs electrochemically combines oxygen with carbonaceous gases, such as natural gas methane, to produce electricity.

Figure 2:
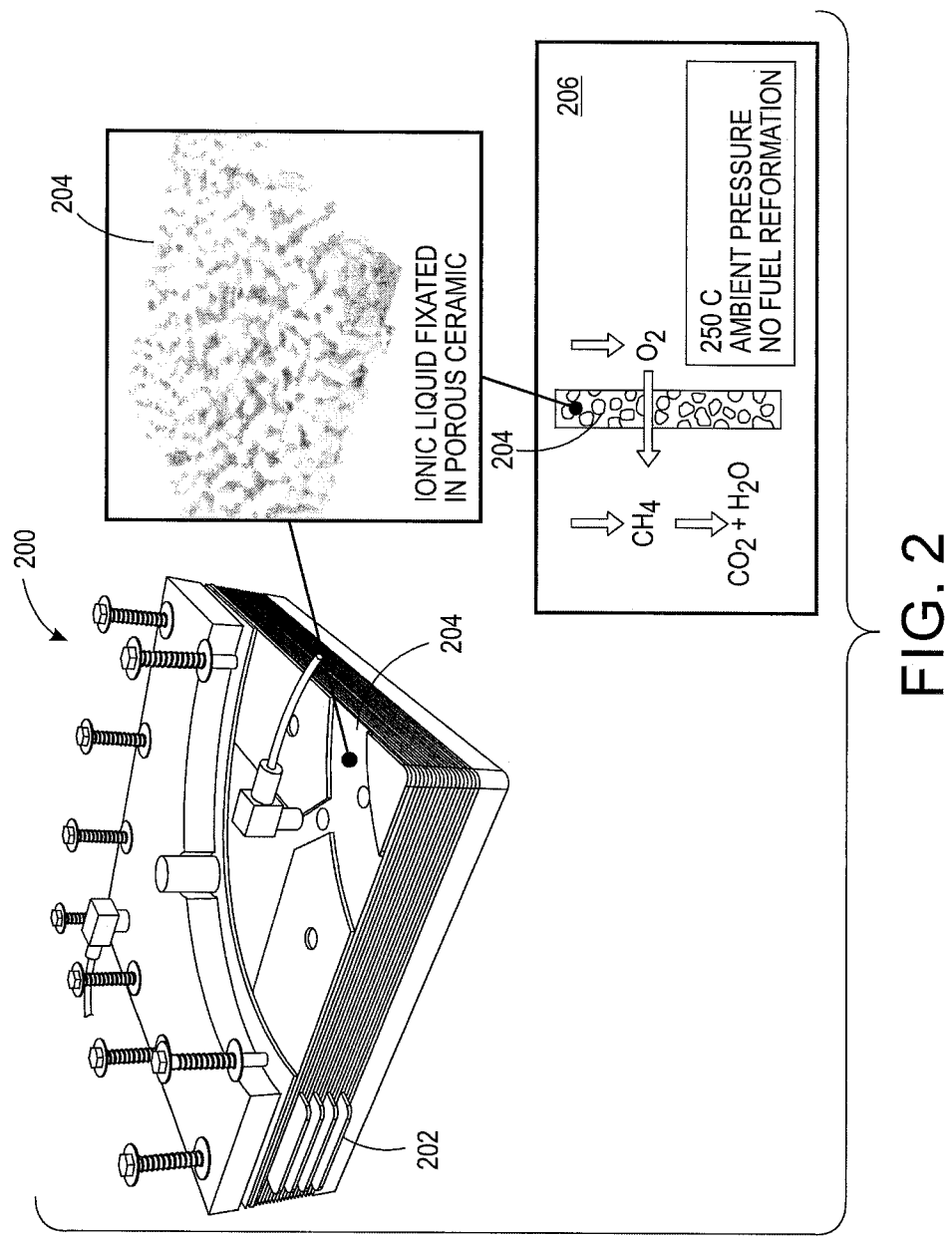
FIG. 2 is a fuel cell construction with a composite ionic liquid/ceramic membrane system.

With reference to FIG. 2, a fuel cell 200 is depicted having a manifold 202 housing a composite IL/ceramic membrane system 204. The manifold 202 includes plastic structures and gaskets.

The composite IL/Ceramic membrane system 204 is depicted within the manifold 202. The membrane system 204 transports oxygen in ionic superoxide form that results in a direct oxygen reaction with a fuel. The ion transport is diagrammed in box 206. The membrane system 204 and fuel cell 200 does not include a methane-to-hydrogen reformer.

Figure 3:
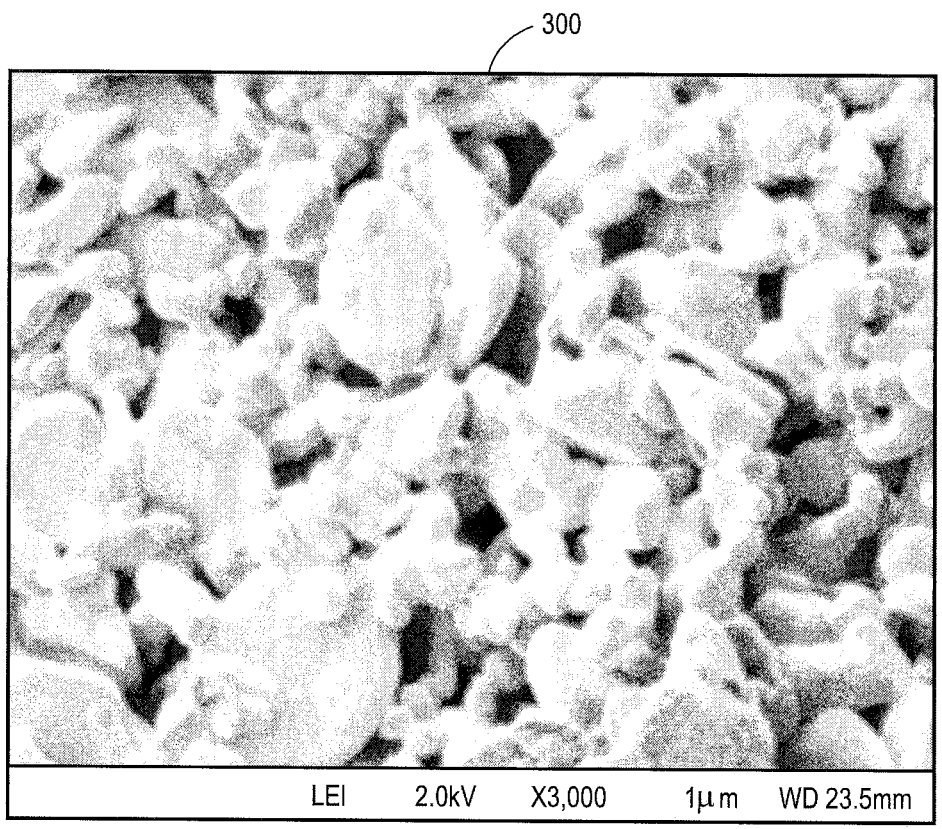
FIG. 3 is a SEM micrograph of a porous ceramic substrate.

The membrane system 204 includes a porous ceramic substrate and an ionic liquid fixated throughout the substrate. With reference to FIG. 3, a Scanning Electron Microscope (SEM) micrograph of a porous ceramic substrate 300 is shown. The substrate 300 is created by fusing alumina ceramic particles of 2-15 micrometers (urn) size into the form of plates. In one embodiment, the resultant pore size of the substrate 300 is about 1-5 um and porosity is approximately 35%. In another embodiment, the substrate 300 is 1 millimeter (mm) thick and can be made as large as 30 centimeter (cm)×30 cm in size. The substrate 300 allows for a catalyst and ionic liquid electrolyte.

Figure 4:
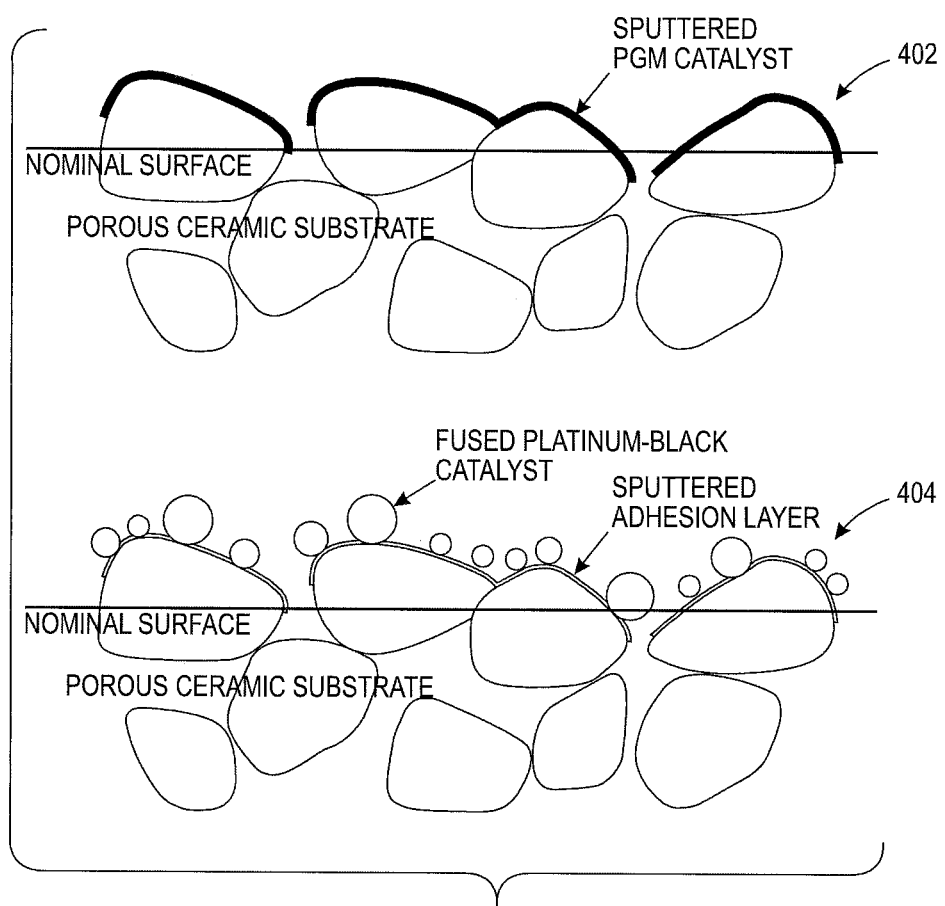
FIG. 4 depicts catalyst materials layered onto a substrate.

The porous ceramic substrate 300 is sputtered or coated with a thin layer of a catalyst material on both sides. With reference to FIG. 4, different layers of the catalyst material are depicted. In one embodiment, a catalyst layer is sputtered 402 on the two sides of the substrate with 0.1 mg/cm2 of Pt together with up to 1 mg/cm2 of another metal, such as Ni, Au, Ag. In another embodiment, a coating 404 of platinum black powder is then sintered at a temperature of 400-1350 C to permanently attach the platinum to the alumina ceramic particles of the substrate 300. This will result in less net PGM loading, where the net catalytic surface area will be more than 20× of projected surface area.

After the porous ceramic substrate 300 is catalyzed, the pores are filled and fixated with an oxygen-conducting ionic liquid. The type of ionic liquid is dependent on the fuel to be used with the fuel cell 200. In one embodiment, methane, in the form of natural gas and oxygen in the form of air are fed to the two sides of the membrane 204. The oxygen is catalyzed at the surface on the oxygen side and enters the ionic liquid volume in the pores as a negatively charged super-oxide. The oxygen becomes a super-oxide by collecting an electron from an oxygen-side electrode. The oxygen side reaction is depicted as:

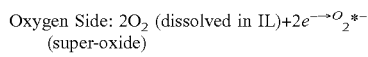

Oxygen Side: $2O_2$ (dissolved in IL)$+2e^- \rightarrow O_2^{*-}$ (super-oxide)

The negatively charged super-oxide travels through the membrane 204 by way of the ionic liquid to the other side of the membrane 204. The super-oxide reacts directly with the methane fuel on the fuel-side catalytic surface to generate carbon dioxide CO2) and water (H2O). The fuel side reaction is depicted as:

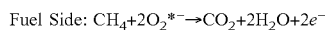

Fuel Side: $CH_4 + 2O_2^{*-} \rightarrow CO_2 + 2H_2O + 2e^-$

The open circuit potential for this reaction at 200 C is approximately 0.8V, for a small test fuel cell. At the temperatures below 400 C, the electrochemical reaction of $CH_4$ and $O_2$ produces a negligent amount CO. Almost all of the carbon in $CH_4$ is converted to $CO_2$. Due to the lower temperature of the fuel side reaction, the fuel cell does not require a CO—$CO_2$ catalytic conversion. This differs from previous SOFCs which require catalytic reformers when operating at temperatures greater than 600 C and produce a significant amount of CO, and therefore must implement catalytic conversion subsystems resulting in added capital cost and reduced efficiency.

Figure 5:
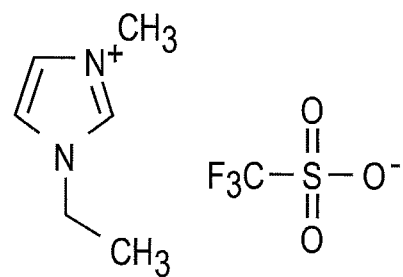
FIG. 5 is a chemical structure of an ionic liquid.

In one embodiment, when using natural gas as the fuel, the natural gas electrochemical oxidation reacts with the ionic liquid $[Emim]^+$ $[OTf2]^-$. With reference to FIG. 5, the chemical structure of the ionic liquid is depicted. In one embodiment, the ionic liquid dissolves an amount of $CH_4$ and $O_2$, which makes the reaction more efficient, since both oxidation and reduction can take place in just one phase, i.e. the liquid phase.

Figure 6:
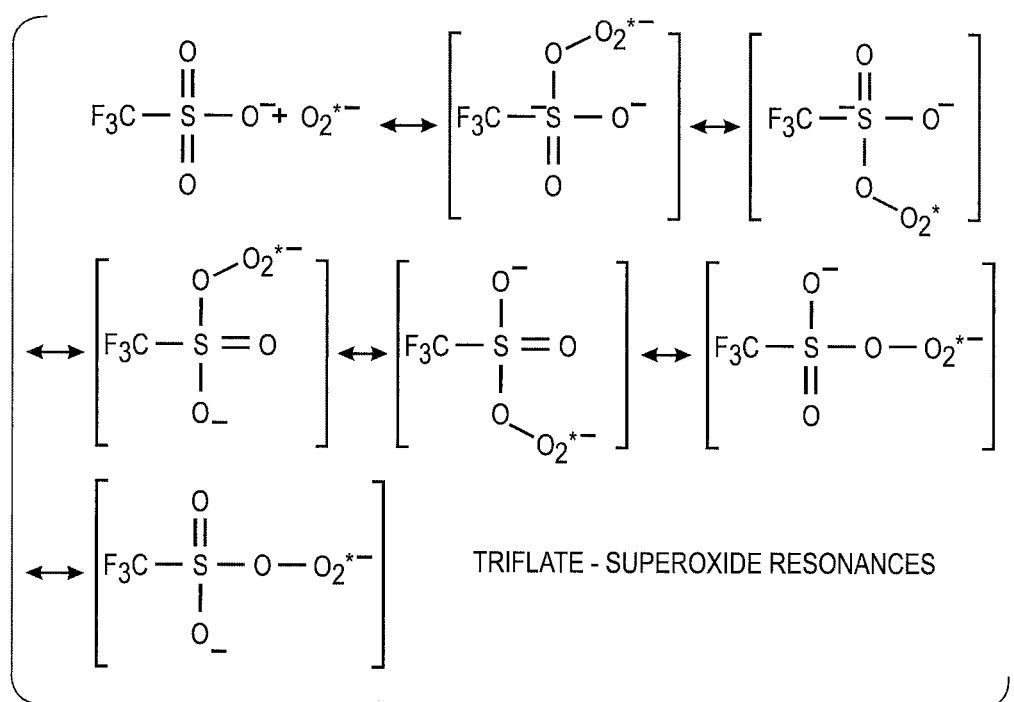
FIG. 6 is a fluorinated ionic liquid with an anion and a cation.

With reference to FIG. 6, a fluorinated ionic liquid consists of a large positive ion and a large negative ion. The anion, i.e. negative ion, determines electrochemical and chemical characteristics of the ionic liquid, and the cation, i.e. positive ion, determines the physical characteristics such as rheology and gas dissolution. In this embodiment, the ionic liquid has the anion [OTf2]– that helps dissolve the oxygen, which is characteristic of a fluorinated ionic liquid, and when the oxygen is converted to a superoxide, the anion helps stabilize it. The large dipole moment of the C—F bond is believed to help hold the super-oxide in resonance and not let it react, which would have resulted in the destruction of the ionic liquid. The cation [Emim]+ helps dissolve methane. The cation also dissolves CO2, which is a product of the reaction. For this chemistry, the dissolved CO2 in fluorinated ionic liquids increases the solubility of both CH4 and O2, enhancing the reaction.

Figure 7:
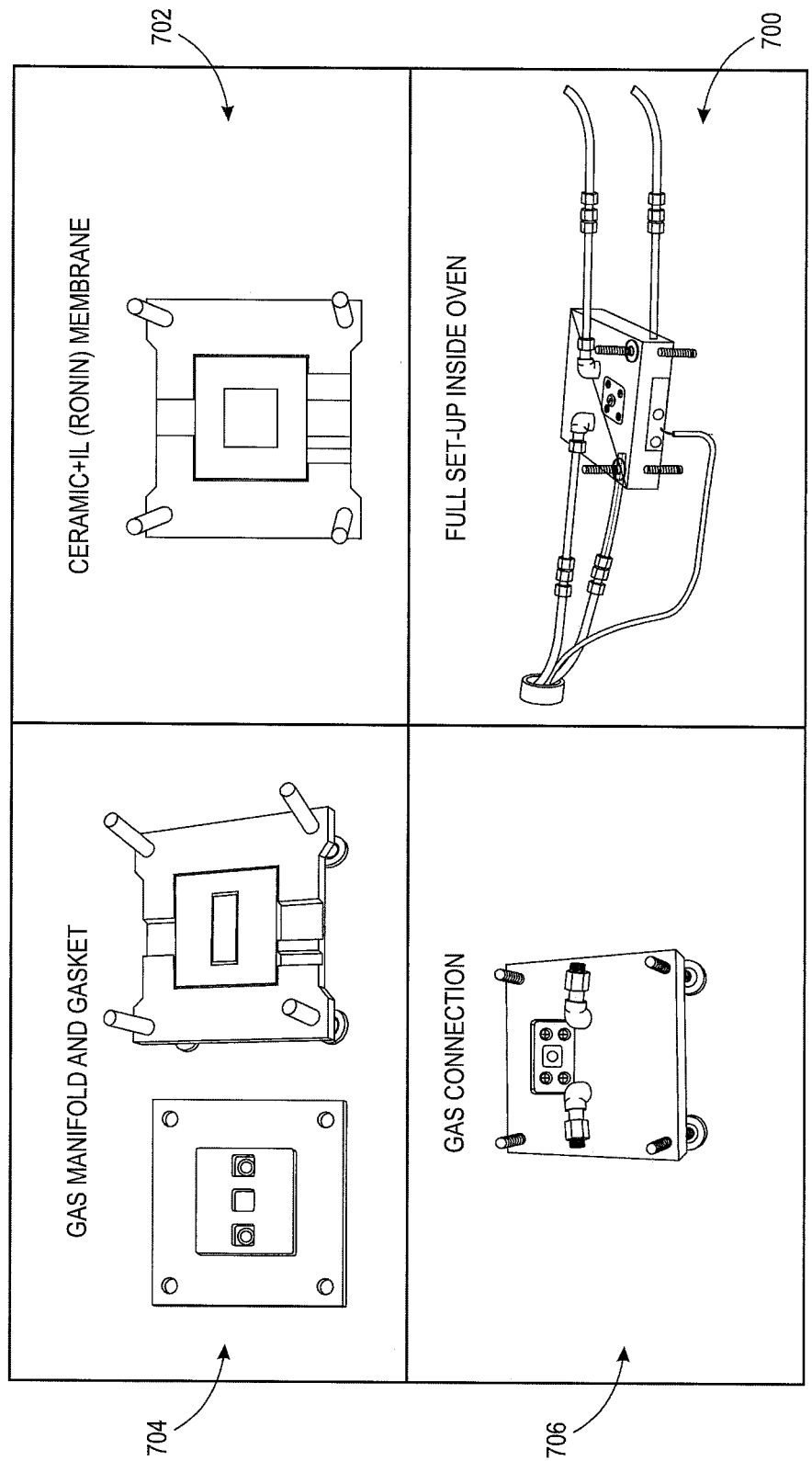
FIG. 7 is a small scale fuel cell.

With reference to FIG. 7, a small scale fuel cell 700 is depicted using the described membrane 702. The fuel cell includes a manifold 704. In one embodiment, the manifold 704 is constructed using graphite felt. The felt is a highly conductive, compressible, and highly porous graphite fiber material. The felt is 95% porous, do not oxidize at this temperature, and are resistant to harsh chemical environments. Such felts have been used in fuel cell and flow cell environments in commercial flow batteries.

The fuel cell further includes structural material such as a bipolar plate used to house the fuel cell parts. In one embodiment, the bipolar plate is a fluoro-carbon/graphite composite plate that is flexible and used in commercial fuel cells and flow batteries. Passive structural materials are made out of high temperature plastics commercially made to operate up to 400 C. One family of high temperature plastics is derived from polytetrafluoroethylene (PTFE), i.e. Teflon, produced by Dupont. Certain variations of PTFE, with appropriate filling material, such as glass fiber, can withstand operating temperatures of 330 C. Such a plastic is successful in a fuel cell at temperatures up to 270 C and without any deterioration. Another family of high temperature plastics is derived out of Silicone derivatives of ester or ketone chains. The structure of one such commercial material, UHT, can be used up to 400 C.

The fuel cell includes gaskets to fit the fuel cell components together. The gasket materials can be fluorocarbon elastomers made out of modified vinylidiene-fluoride-hexafluro-propylene (FFKM), such as Kalrez made by DuPont. It can operate up to temperatures of 327 C. Another family of gasket materials that work in the temperature range of interest is fiber loaded silicones, which operate up to temperature of 450 C.

The fuel cell also includes other parts to finish construction. Bolts, compression springs, and gas fittings can be made of steel. Final current collectors are made of copper. Gas fittings 706 can be made out of copper and a high quality polyolefin-elastomer hybrid, such as Santoprene, depending on the temperature of the place of use. Pressure plates are made of aluminum.

Figure 8:
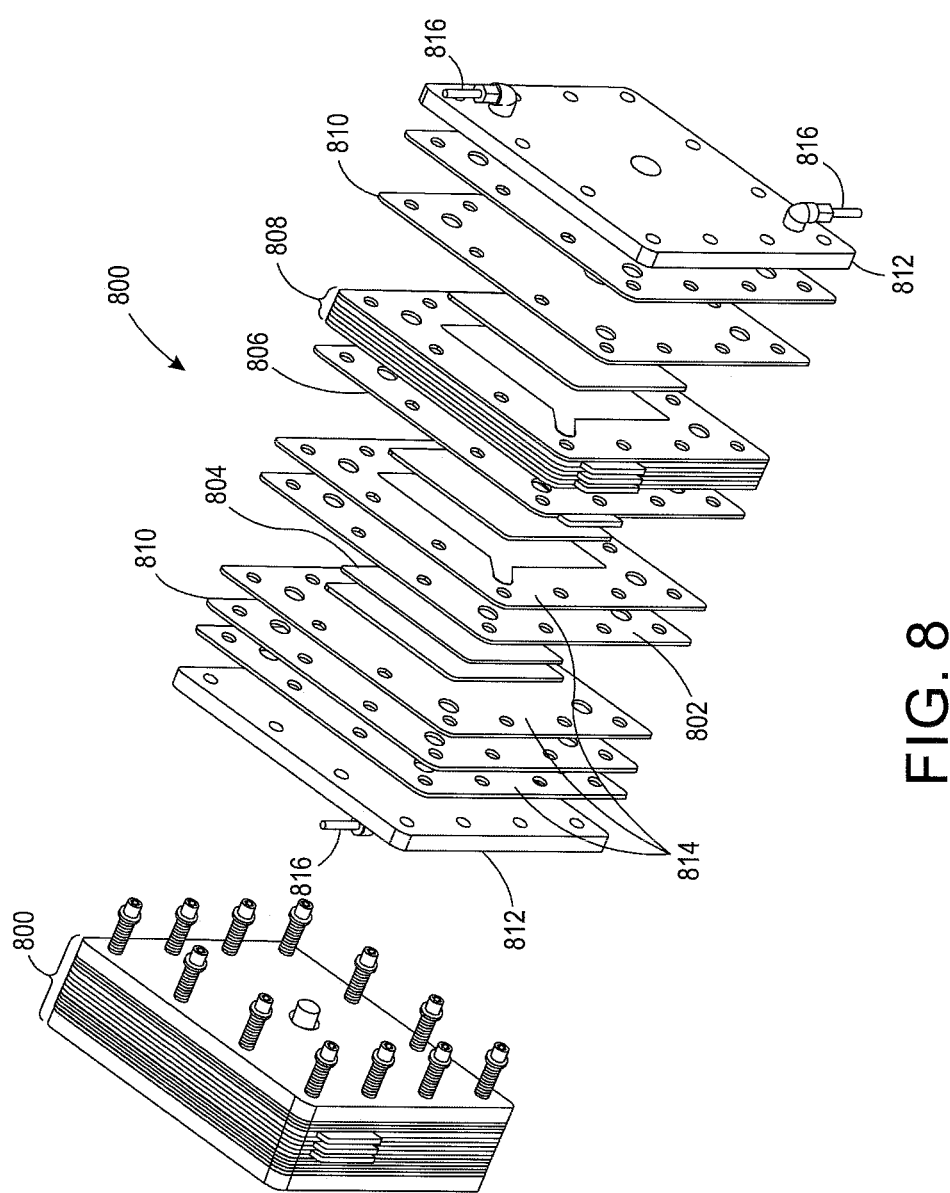
FIG. 8 is a diagram of a multi-cell system.

In another embodiment, fuel cells are stacked together and interconnected in series to produce a summed power. With reference to FIG. 8, a multi-cell system 800 is depicted. It is appreciated in this example the multi-cell system 800 is depicted with seven cells linked in series, however the number of cells in this example is not limiting on the present application.

A ceramic membrane 802 with a catalyzed surface and embedded with an ionic liquid is placed between conductive gas manifolds 804 on either side. The catalyzed surface of the ceramic membrane 802 is located on the anode and cathode side of the membrane 802. In one embodiment, the catalyst material is a platinum group metal, i.e. ruthenium, rhodium, palladium, osmium, iridium, or platinum. In another embodiment, the catalyst material is a non-platinum group metal such as nickel, nickel oxide silver or gold or a platinum group metal loaded nickel, nickel oxide silver, or gold. In one embodiment, the embedded ionic liquid is Butyl-Methyl-Imidazolium-Trifluoro-Methane-Sulphonate (abbreviated as $[C_4C_1Im]^+$ $[Otf]^-$). The anion $[Otf]^-$ is responsible for the activation and conduction of the super-oxide ion. In one embodiment, the choice of the cation of the ionic liquid increases the solubility of oxygen. In another embodiment, the cation, such as Phosphonium, is used to increase the usable temperature range. In one embodiment, porous ceramic membrane 802 is made of sintered alumina with thickness of 1.0 mm, grain and pore size of 1-5 um, and porosity of 35%. In another embodiment, the membrane 802 is about 0.25 mm, and porosity is above 50% to reduce the electrical resistance of the cell.

In one embodiment, the conductive gas manifolds 804 are made of compressible graphite felt. Bipolar plates 806 are placed on either side of the manifolds/membrane assembly 802, 804. In one embodiment, the bipolar plates 806 are made of composite graphite. The bipolar plate/manifold/membrane assembly 802, 804, 806 is repeated to construct seven cells total that are interconnected together in series 808. Electrodes at either end are placed with a current collector 810. In on embodiment, the current collectors 810 are copper plates. Pressure plates 812 are placed with a gas-sealing gasket 814 on either side. In one embodiment, the pressure plates 812 are made of aluminum with a thickness of about half an inch. The pressure plates 812 contain gas in/out fittings 816 for oxygen and fuel. Although seven cells are shown here, the number of cells is not a limiting factor in practical applications.

During operation of the multi-cell system 800, the reaction rate increases faster than linearly with temperature between 150 and 220 C. The temperature can be raised up to 400 C depending upon the ionic liquid used in the membrane 802. The flow distribution of fuel and oxygen on the active area of the membrane through baffles or channels is uniform. A proper distribution of fuel and oxygen affects the performance and life-span of a fuel cell. Graphite felt flow paths are used in the fuel cell 800, where the compressed thickness of the graphite felt is between 1 mm and 5 mm and the compression is between 20% and 80%.

Figure 9:
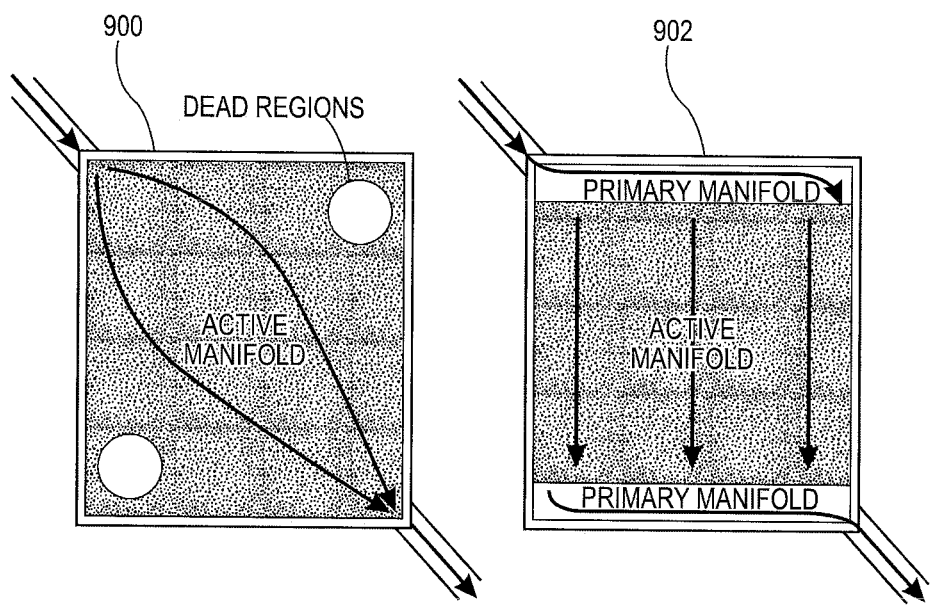
FIG. 9 depicts the relationship between an active manifold and a primary manifold.

The multi-cell stack structure distributes fuel and oxygen into different cells in the stack, with overall pressure and flow rates. The cells are pneumatically in parallel in a stack so the flow rates of fuel and oxygen in each cell must be balanced well. A primary manifold is designed in each cell to offer a lower resistance than the main active manifold so that the gas distribution is uniform. With reference to FIG. 9, the relationship between the primary and active manifold is shown. The width of the active manifold 900 is 10-50 times the width of the primary manifold 902. In one embodiment, instead of a felt-like active manifold, a serpentine active manifold & paths with different materials, such as reticulated felt & expanded graphite, stamped nickel-plated steel channels are used.

Figure 10:
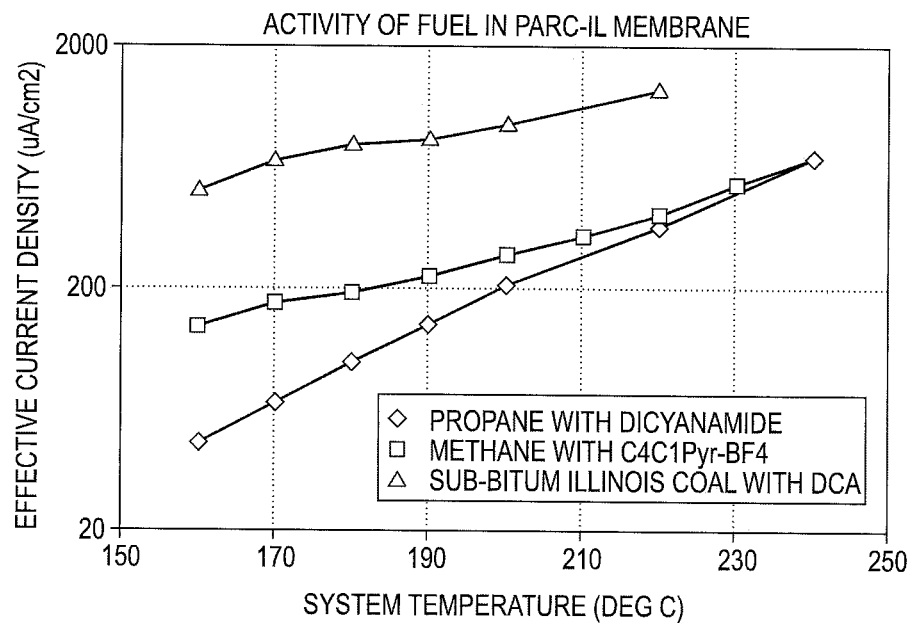
FIG. 10 is a current density versus temperature plot for different fuels used with the fuel cell.

The fuel cell is adaptable to using different fuels. With reference to FIG. 10, current density versus temperature is graphed for different fuels used with the fuel cell. The effective current density is measured by dividing the total current (micro-ampere) by the projected area ($cm^2$) of the membrane. The multi-cell stack is placed in a temperature controlled environment for temperatures up to 400 degrees. Alternate fuels can be hydrogen, butane, propane, or coal. For each alternate fuel, different ionic liquids operate within the fuel cell to different levels of reactivity. For example, the ionic liquid Ethyl-Methyl-Imidazolium-Dicyanamide (abbreviated as $[Emim]^+[Dicyanamide]^-$) works well for sub-bituminous coal, while methane fuel works well with the ionic liquid Ethyl-Methyl-Pyrrolinidium-Boron-Tetratfluoride (abbreviated as $[EmPyr]^+[BF_4]^-$ or $[Emim]^+[OTf2]^-$).

Figure 11:
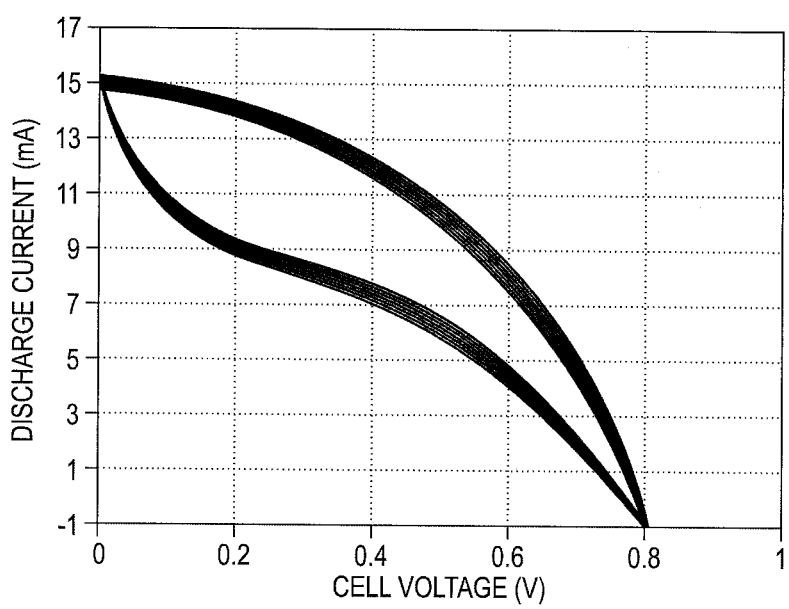
FIG. 11 is a polarization plot for methane used with the fuel cell.

With reference to FIG. 11, a polarization plot for methane at 220 C with $[Emim]^+[OTf2]^-$ is shown for a fuel cell with 2 $cm^2$ cross sectional area. The y-axis is a non-linear LOG scale showing that reaction rate increases fast than linear as discussed earlier. The Open Circuit Voltage (OCV) is shown to be 0.8V for these conditions. The short circuit current is 15 mA, and current at 70% OCV (=0.56V) is about 9.5 mA. With the cell area of 2 $cm^2$, the current density is calculated to be approximately 5 mA/$cm^2$.

It is appreciated that the present application is not limited to the size of the experimental fuel cell. The fuel cell and/or multi-cell stack can be expanded for greater current and voltage output.

Figure 12:
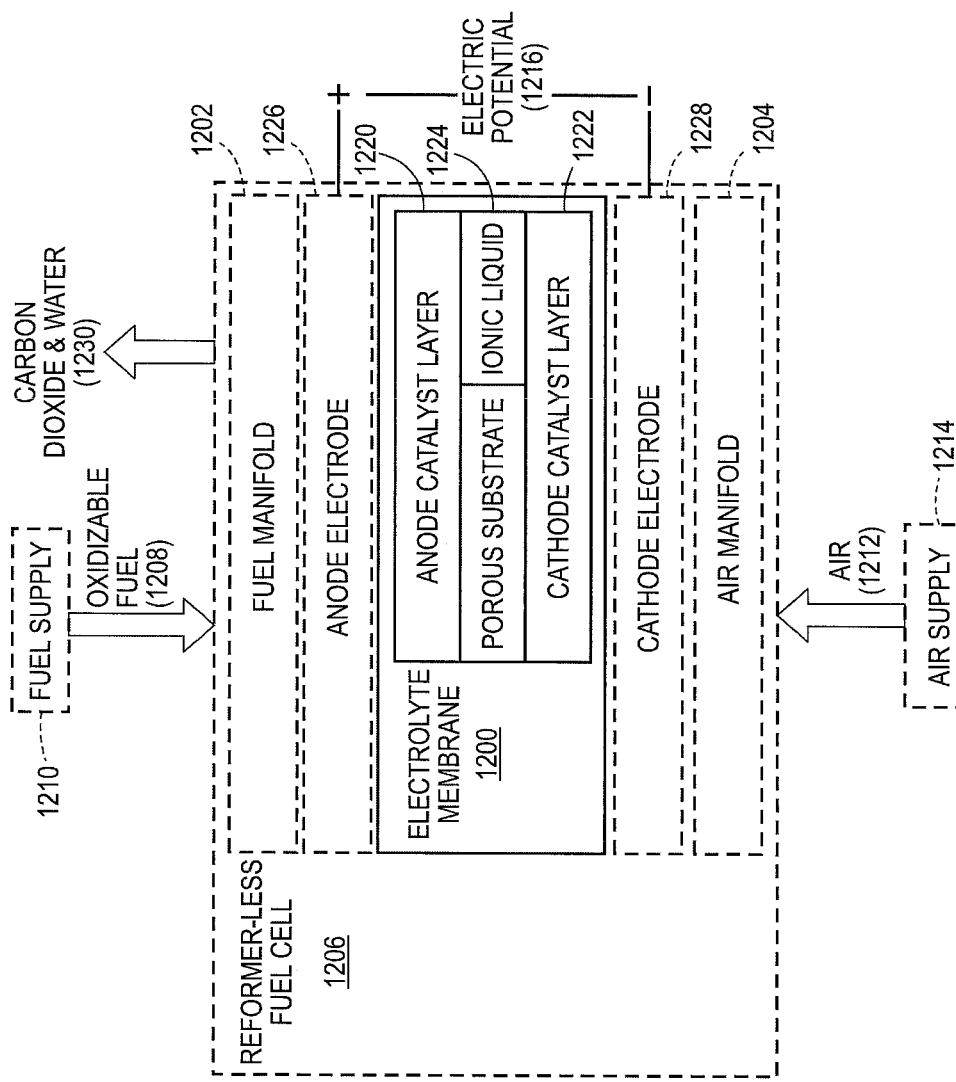
FIG. 12 is a block diagram of an exemplary embodiment of an electrolyte membrane associated with a reformer-less fuel cell.

With reference to FIG. 12, an exemplary embodiment of an electrolyte membrane 1200 is configured to be assembled with a fuel manifold 1202 and an air manifold 1204 to form a reformer-less fuel cell 1206. The fuel manifold 1202 is configured to receive an oxidizable fuel 1208 (e.g., hydrogen or a carbonaceous fuel, such as Methane) from a fuel supply 1210 in a gaseous form, a liquid form, a slurry form, or any suitable form. The air manifold 1204 is configured to receive air 1212 from an air supply 1214. The air 1212 comprising at least oxygen. The electrolyte membrane 1200 is configured to conduct oxygen in an ionic superoxide form when the reformer-less fuel cell 1206 is exposed to operating temperatures above the boiling point of water to electrochemically combine the oxygen with the oxidizable fuel 1208 to produce electricity 1216.

The electrolyte membrane 1200 includes a porous substrate 1218, an anode catalyst layer 1220, a cathode catalyst layer 1222, and an ionic liquid 1224. The porous substrate 1218 formed by electrically non-conductive particles, such as Alumina ($Al_2O_3$). The anode catalyst layer 1220 deposited along a fuel manifold side of the porous substrate 1218. The cathode catalyst layer 1222 deposited along an air manifold side of the porous substrate 1218. The ionic liquid 1224 filling the porous substrate 1218 between the anode and cathode catalyst layers 1220, 1222 to form the electrolyte membrane 1200.

In another embodiment of the electrolyte membrane 1200, the porous substrate 1218 is formed by fusing the electrically non-conductive particles. In yet another embodiment of the electrolyte membrane 1200, the porous substrate 1218 is formed into a porous plate with a predetermined thickness. The porous plate defining the fuel manifold and air manifold sides of the porous substrate 1218 and the predetermined thickness defining a space between the anode and cathode catalyst layers 1220, 1222. In still another embodiment of the electrolyte membrane 1200, the electrically non-conductive particles comprise ceramic particles, glass particles, alumina ceramic particles, or any suitable type of particles. In another embodiment of the electrolyte membrane 1200, sizes of the electrically non-conductive particles range from 2 to 15 um.

In still yet another embodiment of the electrolyte membrane 1200, the ionic liquid 1224 maintains a liquid form, an impedance of less than 1000 Ohm/cm, and a vapor pressure of less than 0.1 psi at operating temperatures ranging from 40° to 200° C. In another embodiment of the electrolyte membrane 1200, the ionic liquid 1224 comprises molecules with at least one carbon atom. In yet another embodiment of the electrolyte membrane 1200, the ionic liquid 1224 comprises a fluorinated ionic liquid. In still another embodiment of the electrolyte membrane 1200, the ionic liquid 1224 comprises [Emim]$^+$[OTf2]$^-$; [$C_4C_1$Im]$^+$[Otf]$^-$; [Phosphonium]$^+$[Otf]$^-$; [Emim]$^+$[Dicyanamide]$^-$; [EmPyr]$^+$[BF$_4$]$^-$; or any suitable ionic liquid. In yet another embodiment of the electrolyte membrane 1200, the ionic liquid 1224 comprises a cation and an anion. In this embodiment, the cation comprising [Emim]$^+$, [$C_4C_1$Im]$^+$, [Phosphonium]$^+$, [EmPyr]$^+$, or any suitable cation. In the embodiment being described, the anion comprising [OTf2]$^-$, [Otf]$^-$, [Dicyanamide]$^-$, [BF$_4$]$^-$, or any suitable anion.

In another embodiment of the electrolyte membrane 1200, the anode catalyst layer 1220 comprises a platinum group metal, a ruthenium element, a rhodium element, a palladium element, an osmium element, an iridium element, a platinum element, a nickel element, a nickel-oxide compound, a gold element, a silver element, or any suitable catalyst element or compound.

In yet another embodiment of the electrolyte membrane 1200, the cathode catalyst layer 1222 comprises a platinum group metal, a ruthenium element, a rhodium element, a palladium element, an osmium element, an iridium element, a platinum element, a nickel element, a nickel-oxide compound, a gold element, a silver element, or any suitable catalyst element or compound.

In still another embodiment, the electrolyte membrane 1200 is configured to be assembled in the reformer-less fuel cell 1206 with an anode electrode 1226 disposed in relation to the anode catalyst layer 1220 and a cathode electrode 1228 disposed in relation to the cathode catalyst layer 1222 such that an electrochemical potential 1216 is generated across the anode and cathode electrodes 1226, 1228 and a corresponding current travels through the anode and cathode electrodes 1226, 1228 after the reformer-less fuel cell 1206 is exposed to operating temperatures above the boiling point of water and after oxidizable fuel 1208 is supplied to the fuel manifold 1202 and air 1212 is supplied to the air manifold 1204. In a further embodiment, in conjunction with conducting oxygen, the electrolyte membrane 1200 is configured to catalyze a superoxide at the cathode catalyst layer 1222 such that a negatively charged ionized form of the superoxide enters the ionic liquid 1224 by collecting an electron from the cathode electrode 1228. In an even further embodiment, in conjunction with conducting oxygen, the electrolyte membrane 1200 is configured to conduct the negatively charged ionized form of the superoxide through the ionic liquid 1224 to the anode catalyst layer 1220 where it reacts with the oxidizable fuel 1208 to generate carbon dioxide and water 1230.

In still yet another embodiment, the electrolyte membrane 1200 is configured to conduct oxygen in the ionic superoxide form when the reformer-less fuel cell 1206 is exposed to operating temperatures below 500° C.

In another embodiment, the electrolyte membrane 1200 is configured to conduct oxygen in the ionic superoxide form when the reformer-less fuel cell 1206 is exposed to operating temperatures below 300° C. In yet another embodiment, the electrolyte membrane 1200 is configured to conduct oxygen in the ionic superoxide form when the reformer-less fuel cell 1206 is exposed to operating temperatures ranging from 200° to 300° C.

In still another embodiment of the electrolyte membrane 1200, the oxidizable fuel 1208 in the gaseous form comprises a hydrogen gas, a methane gas, a butane gas, a propane gas, a natural gas, a gaseous hydrocarbon, or any other suitable oxidizable gas. In yet another embodiment of the electrolyte membrane 1200, the oxidizable fuel 1208 in the liquid form comprises an olefin, an alcohol, an organic acid, an ester, an aldehyde, a petroleum, a liquid hydrocarbon, or any other suitable oxidizable liquid. In another embodiment of the electrolyte membrane 1200, the oxidizable fuel 1208 in the slurry form comprises a coal powder, a solid hydrocarbon pulverized to form a corresponding powder, or any other suitable oxidizable powder. In yet another embodiment of the electrolyte membrane 1200, the oxidizable fuel 1208 in the slurry form comprises a solid hydrocarbon pulverized to form a corresponding powder that is mixed with the ionic liquid 1224.

Figure 13:
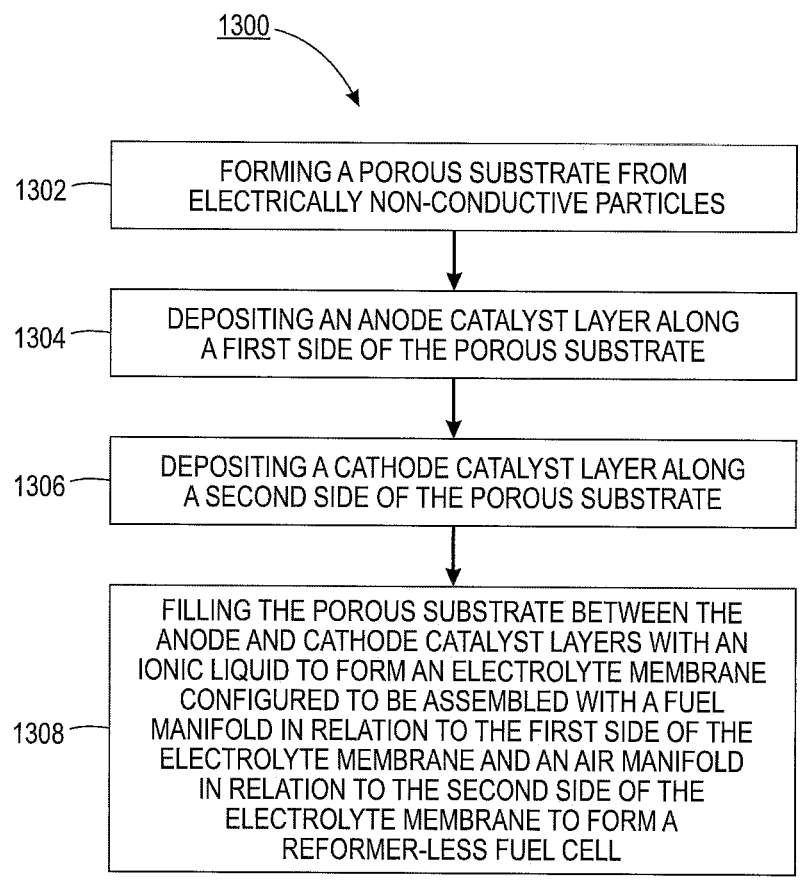
FIG. 13 is a flowchart of an exemplary embodiment of a process for manufacturing an electrolyte membrane associated with a reformer-less fuel cell.

With reference to FIG. 13, an exemplary embodiment of a process 1300 for manufacturing an electrolyte membrane associated with a reformer-less fuel cell begins at 1302 where a porous substrate is formed from electrically non-conductive particles. At 1304, an anode catalyst layer is deposited along a first side of the porous substrate. Next, a cathode catalyst layer is deposited along a second side of the porous substrate (1306). At 1308, the porous substrate between the anode and cathode catalyst layers is filled with an ionic liquid to form the electrolyte membrane. The electrolyte membrane is configured to be assembled with a fuel manifold in relation to the first side of the electrolyte membrane and an air manifold in relation to the second side of the electrolyte membrane to form a reformer-less fuel cell. The fuel manifold is configured to receive an oxidizable fuel (e.g., hydrogen or a carbonaceous fuel, such as Methane) from a fuel supply in a gaseous form, a liquid form, a slurry form, or any suitable form. The air manifold is configured to receive air from an air supply. The air comprising at least oxygen. The electrolyte membrane is configured to conduct oxygen in an ionic superoxide form when the reformer-less fuel cell is exposed to operating temperatures above the boiling point of water to electrochemically combine the oxygen with the oxidizable fuel to produce electricity.

In another embodiment, the process 1300 also includes fusing the electrically non-conductive particles to form the porous substrate. In yet another embodiment of the process 1300, the porous substrate is formed such that pores range from 1 nanometer (nm) to 10 um. In still another embodiment of the process 1300, the porous substrate is formed such that pores range from 1 to 5 um. In still yet another embodiment of the process 1300, the porous substrate is formed such that porosity of the porous substrate is about 35 percent. In another embodiment of the process 1300, the porous substrate is formed such that porosity of the porous substrate ranges from about 35 to above 50 percent.

In yet another embodiment, the process 1300 also includes forming the porous substrate into a porous plate with a predetermined thickness, the porous plate defining the first and second sides of the porous substrate and the predetermined thickness defining a space between the anode and cathode catalyst layers. In still another embodiment of the process 1300, the electrically non-conductive particles comprise ceramic particles, glass particles, alumina ceramic particles, or any suitable type of particles.

In still yet another embodiment of the process 1300, sizes of the electrically non-conductive particles range from 2 to 15 um. In another embodiment of the process 1300, the ionic liquid comprises molecules with at least one carbon atom. In yet another embodiment of the process 1300, the ionic liquid comprises a fluorinated ionic liquid. In still another embodiment of the process 1300, the ionic liquid comprises [Emim]+[OTf2]−; [C4C1Im]+[Otf]−; [Phosphonium]+[Otf]−; [Emim]+[Dicyanamide]−; [EmPyr]+[BF4]−; or any suitable ionic liquid. In still yet another embodiment of the process 1300, the ionic liquid comprises a cation and an anion. In this embodiment, the cation comprising [Emim]+, [C4C1Im]+, [Phosphonium]+, [EmPyr]+, or any suitable cation. In the embodiment being described, the anion comprising one of [OTf2]−, [Otf]−, [Dicyanamide]−, [BF4]−, or any suitable anion.

In another embodiment of the process 1300, the anode catalyst layer comprises a platinum group metal, a ruthenium element, a rhodium element, a palladium element, an osmium element, an iridium element, a platinum element, a nickel element, a nickel-oxide compound, a gold element, a silver element, or any suitable catalyst element or compound.

In yet another embodiment, process 1300 also includes sintering, sputtering, or thin layer metal sputtering the anode catalyst layer on the first side of the porous substrate. Next, the anode catalyst layer is electrochemically plated.

In still another embodiment, the process 1300 also includes sputtering 0.1 mg/cm2 of a platinum group metal with 1.0 mg/cm2 of a nickel element, a nickel-oxide compound, a gold element, a silver element, or any suitable catalyst element or compound on the first side of the porous substrate to form the anode catalyst layer.

In yet another embodiment, the process 1300 also includes sputtering an adhesion layer on the first side of the porous substrate. Next, a coating of platinum black powder is sintered to the adhesion layer to form the anode catalyst layer. In another embodiment of the process 1300, the cathode catalyst layer comprises one of a platinum group metal, a ruthenium element, a rhodium element, a palladium element, an osmium element, an iridium element, a platinum element, a nickel element, a nickel-oxide compound, a gold element, a silver element, or any suitable catalyst element or compound.

In yet another embodiment, the process 1300 also includes sintering, sputtering, or thin layer metal sputtering the cathode catalyst layer on the second side of the porous substrate. Then, the cathode catalyst layer is electrochemically plated.

In still another embodiment, the process 1300 also includes sputtering 0.1 mg/cm2 of a platinum group metal with 1.0 mg/cm2 of a nickel element, a nickel-oxide compound, a gold element, a silver element, or any suitable catalyst element or compound on the second side of the porous substrate to form the cathode catalyst layer.

In still yet another embodiment, the process 1300 also includes sputtering an adhesion layer on the second side of the porous substrate. Next, a coating of platinum black powder is sintered to the adhesion layer to form the cathode catalyst layer.

In another embodiment of the process 1300, the electrolyte membrane is configured to conduct oxygen in the ionic superoxide form when the reformer-less fuel cell is exposed to operating temperatures below 500° C. In yet another embodiment of the process 1300, the electrolyte membrane is configured to conduct oxygen in the ionic superoxide form when the reformer-less fuel cell is exposed to operating temperatures below 300° C. In still another embodiment of the process 1300, the electrolyte membrane is configured to conduct oxygen in the ionic superoxide form when the reformer-less fuel cell is exposed to operating temperatures ranging from 200° to 300° C.

In still yet another embodiment of the process 1300, the oxidizable fuel in the gaseous form comprises at least one of a hydrogen gas, a methane gas, a butane gas, a propane gas, a natural gas, and a gaseous hydrocarbon. In another embodiment of the process 1300, the oxidizable fuel in the liquid form comprises at least one of an olefin, an alcohol, an organic acid, an ester, an aldehyde, a petroleum, and a liquid hydrocarbon. In yet another embodiment of the process 1300, the oxidizable fuel in the slurry form comprises at least one of a coal powder and a solid hydrocarbon pulverized to form a corresponding powder. In still another embodiment of the process 1300, the oxidizable fuel in the slurry form comprises a solid hydrocarbon pulverized to form a corresponding powder that is mixed with the ionic liquid.

Figure 14:
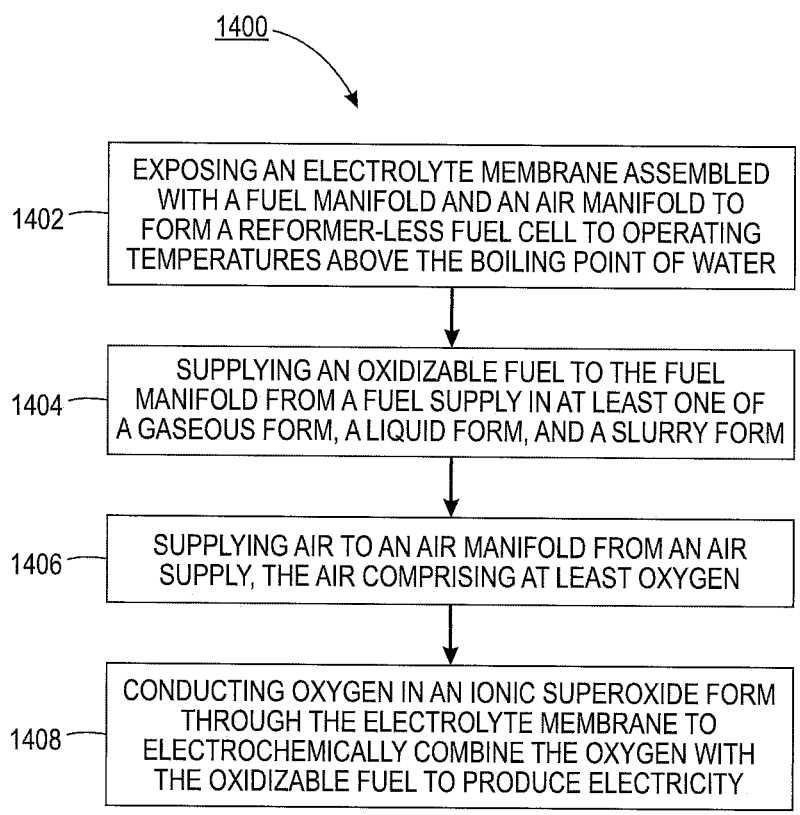
FIG. 14 is a flowchart of an exemplary embodiment of a process for operating an electrolyte membrane associated with a reformer-less fuel cell.

With reference to FIG. 14, an exemplary embodiment of a process 1400 for operating an electrolyte membrane associated with a reformer-less fuel cell begins at 1402 where an electrolyte membrane assembled with a fuel manifold and an air manifold to form a reformer-less fuel cell is exposed to operating temperatures above the boiling point of water. At 1404, an oxidizable fuel (e.g., hydrogen or a carbonaceous fuel, such as Methane) is supplied to the fuel manifold from a fuel supply in a gaseous form, a liquid form, a slurry form, or any suitable form. Next, air is supplied to an air manifold from an air supply (1406). The air comprising at least oxygen. At 1408, oxygen in an ionic superoxide form is conducted through the electrolyte membrane to electrochemically combine the oxygen with the oxidizable fuel to produce electricity. The electrolyte membrane includes a porous substrate formed by electrically non-conductive particles, an anode catalyst layer deposited along a fuel manifold side of the porous substrate, a cathode catalyst layer deposited along an air manifold side of the porous substrate; and an ionic liquid filling the porous substrate between the anode and cathode catalyst layers.

In another embodiment of the process 1400, the porous substrate is formed by fusing the electrically non-conductive particles. In yet another embodiment of the process 1400, the porous substrate is formed into a porous plate with a predetermined thickness. The porous plate defining the fuel manifold and air manifold sides of the porous substrate and the predetermined thickness defining a space between the anode and cathode catalyst layers. In still another embodiment of the process 1400, the electrically non-conductive particles comprise ceramic particles, glass particles, alumina ceramic particles, or any suitable type of particles.

In still yet another embodiment of the process 1400, the ionic liquid maintains a liquid form, an impedance of less than 1000 Ohm/cm, and a vapor pressure of less than 0.1 psi at operating temperatures ranging from 40° to 200° C. In another embodiment of the process 1400, the ionic liquid comprises molecules with at least one carbon atom. In yet another embodiment of the process 1400, the ionic liquid comprises a fluorinated ionic liquid. In still another embodiment of the process 1400, the ionic liquid comprises [Emim]+[OTf2]−; [C4C1Im]+[Otf]−; [Phosphonium]+[Otf]−; [Emim]+[Dicyanamide]−; [EmPyr]+[BF4]−; or any suitable ionic liquid. In still another embodiment of the process 1400, the ionic liquid comprises a cation and an anion. In this embodiment, the cation comprising [Emim]+, [C4C1Im]+, [Phosphonium]+, [EmPyr]+, or any suitable cation. In the embodiment being described, the anion comprising one of [OTf2]−, [Otf]−, [Dicyanamide]−, [BF4]−, or any suitable anion.

In yet another embodiment of the process 1400, the anode catalyst layer comprises a platinum group metal, a ruthenium element, a rhodium element, a palladium element, an osmium element, an iridium element, a platinum element, a nickel element, a nickel-oxide compound, a gold element, a silver element, or any suitable catalyst element or compound.

In another embodiment of the process 1400, the cathode catalyst layer comprises a platinum group metal, a ruthenium element, a rhodium element, a palladium element, an osmium element, an iridium element, a platinum element, a nickel element, a nickel-oxide compound, a gold element, a silver element, or any suitable catalyst element or compound.

In yet another embodiment of the process 1400, the electrolyte membrane is configured to be assembled in the reformer-less fuel cell with an anode electrode disposed in relation to the anode catalyst layer and a cathode electrode disposed in relation to the cathode catalyst layer. In this embodiment, the process 1400 also includes generating an electrochemical potential across the anode and cathode electrodes and a corresponding current traveling through the anode and cathode electrodes. In a further embodiment, the process 1400 also includes catalyzing a superoxide at the cathode catalyst layer such that a negatively charged ionized form of the superoxide enters the ionic liquid by collecting an electron from the cathode electrode. In an even further embodiment, the process 1400 also includes conducting the negatively charged ionized form of the superoxide through the ionic liquid to the anode catalyst layer where it reacts with the oxidizable fuel to generate carbon dioxide and water.

In still another embodiment, the process 1400 also includes conducting oxygen in the ionic superoxide form when the reformer-less fuel cell is exposed to operating temperatures below 500° C. In still yet another embodiment, the process 1400 also includes conducting oxygen in the ionic superoxide form when the reformer-less fuel cell is exposed to operating temperatures below 300° C. In another embodiment, the process 1400 also includes conducting oxygen in the ionic superoxide form when the reformer-less fuel cell is exposed to operating temperatures ranging from 200° to 300° C.

In yet another embodiment of the process 1400, the oxidizable fuel in the gaseous form comprises a hydrogen gas, a methane gas, a butane gas, a propane gas, a natural gas, a gaseous hydrocarbon, or any suitable oxidizable gas. In still another embodiment of the process 1400, the oxidizable fuel in the liquid form comprises an olefin, an alcohol, an organic acid, an ester, an aldehyde, a petroleum, a liquid hydrocarbon, or any suitable oxidizable liquid. In still yet another embodiment of the process 1400, the oxidizable fuel in the slurry form comprises at least one of a coal powder, a solid hydrocarbon pulverized to form a corresponding powder, or any suitable oxidizable powder. In still yet another embodiment of the process 1400, the oxidizable fuel in the slurry form comprises a solid hydrocarbon pulverized to form a corresponding powder that is mixed with the ionic liquid.

It will be appreciated that variants of the above-disclosed and other features and functions, or alternatives thereof, may be combined into many other different computer platforms, computer applications, or combinations thereof. Various presently unforeseen or unanticipated alternatives, modifications, variations, or improvements therein may be subsequently made by those skilled in the art which are also intended to be encompassed by the following claims.

What is claimed is:

1. An apparatus for a reformer-less fuel cell, comprising:
an electrolyte membrane configured to be assembled with a fuel manifold and an air manifold to form a reformer-less fuel cell, wherein the fuel manifold is configured to receive an oxidizable fuel from a fuel supply in at least one of a gaseous form, a liquid form, and a slurry form, wherein the air manifold is configured to receive air from an air supply, the air comprising at least oxygen, wherein the electrolyte membrane is configured to conduct oxygen in an ionic superoxide form when the reformer-less fuel cell is exposed to operating temperatures above the boiling point of water to electrochemically combine the oxygen with the oxidizable fuel to produce electricity, the electrolyte membrane comprising:
a porous electrically non-conductive substrate;
an anode catalyst layer deposited along a fuel manifold side of the porous substrate;
a cathode catalyst layer deposited along an air manifold side of the porous substrate; and
an ionic liquid filling the porous substrate between the anode and cathode catalyst layers to form the electrolyte membrane.

2. The apparatus of claim 1 wherein the ionic liquid comprises molecules with at least one carbon atom.

3. The apparatus of claim 1 wherein the ionic liquid comprises a fluorinated ionic liquid.

4. The apparatus of claim 1 wherein the ionic liquid comprises a cation and an anion, the cation comprising one of Ethyl-Methyl-Imidazolium, Butyl-Methyl-Imidazolium, [Phosphonium]$^+$, and Ethyl-Methyl-Pyrrolidinium, the anion comprising one of Trifluoro-Methane-Solphonate, [Dicyanamide]$^-$, and [BF$_4$].

5. The apparatus of claim 1 wherein the anode catalyst layer comprises at least one of a platinum group metal, a ruthenium element, a rhodium element, a palladium element, an osmium element, an iridium element, a platinum element, a nickel element, a nickel-oxide compound, a gold element, and a silver element;
wherein the cathode catalyst layer comprises one of a platinum group metal, a ruthenium element, a rhodium element, a palladium element, an osmium element, an iridium element, a platinum element, a nickel element, a nickel-oxide compound, a gold element, and a silver element.

6. The apparatus of claim 1 wherein the electrolyte membrane is configured to be assembled in the reformer-less fuel cell with an anode electrode disposed in relation to the anode catalyst layer and a cathode electrode disposed in relation to the cathode catalyst layer such that an electrochemical potential is generated across the anode and cathode electrodes and a corresponding current travels through the anode and cathode electrodes after the reformer-less fuel cell is exposed to operating temperatures above the boiling point of water and after oxidizable fuel is supplied to the fuel manifold and air is supplied to the air manifold.

7. The apparatus of claim 1 wherein the electrolyte membrane is configured to conduct oxygen in the ionic superoxide form when the reformer-less fuel cell is exposed to operating temperatures below 500° C.

8. The apparatus of claim 1 wherein the oxidizable fuel in the gaseous form comprises at least one of a hydrogen gas, a methane gas, a butane gas, a propane gas, a natural gas, and a gaseous hydrocarbon.

9. The apparatus of claim 1 wherein the oxidizable fuel in the liquid form comprises at least one of an olefin, an alcohol, an organic acid, an ester, an aldehyde, a petroleum, and a liquid hydrocarbon.

10. The apparatus of claim 1 wherein the oxidizable fuel in the slurry form comprises at least one of a coal powder and a solid hydrocarbon pulverized to form a corresponding powder.

11. A method of manufacturing an apparatus for a reformer-less fuel cell, comprising:
forming a porous substrate from electrically non-conductive particles;
depositing an anode catalyst layer along a first side of the porous substrate;
depositing a cathode catalyst layer along a second side of the porous substrate; and
filling the porous substrate between the anode and cathode catalyst layers with an ionic liquid to form an electrolyte membrane configured to be assembled with a fuel manifold in relation to the first side of the electrolyte membrane and an air manifold in relation to the second side of the electrolyte membrane to form a reformer-less fuel cell, wherein the fuel manifold is configured to receive an oxidizable fuel from a fuel supply in at least one of a gaseous form, a liquid form, and a slurry form, wherein the air manifold is configured to receive air from an air supply, the air comprising at least oxygen, wherein the electrolyte membrane is configured to conduct oxygen in an ionic superoxide form when the reformer-less fuel cell is exposed to operating temperatures above the boiling point of water to electrochemically combine the oxygen with the oxidizable fuel to produce electricity.

12. The method of claim 11, further comprising:
fusing the electrically non-conductive particles to form the porous substrate.

13. The method of claim 11, further comprising:
forming the porous substrate into a porous plate with a predetermined thickness, the porous plate defining the first and second sides of the porous substrate and the predetermined thickness defining a space between the anode and cathode catalyst layers.

14. The method of claim 11, further comprising:
sintering, sputtering, or thin layer metal sputtering the anode catalyst layer on the first side of the porous substrate; and
electrochemically plating the anode catalyst layer.

15. The method of claim 11, further comprising:
sputtering an adhesion layer on the first side of the porous substrate; and
sintering a coating of platinum black powder to the adhesion layer to form the anode catalyst layer.

16. The method of claim 11, further comprising:
sintering, sputtering, or thin layer metal sputtering the cathode catalyst layer on the second side of the porous substrate; and
electrochemically plating the cathode catalyst layer.

17. The method of claim 11, further comprising:
sputtering an adhesion layer on the second side of the porous substrate; and
sintering a coating of platinum black powder to the adhesion layer to form the cathode catalyst layer.

18. A method of operating an apparatus for a reformer-less fuel cell, comprising:
exposing an electrolyte membrane assembled with a fuel manifold and an air manifold to form a reformer-less fuel cell to operating temperatures above the boiling point of water;
supplying an oxidizable fuel to the fuel manifold from a fuel supply in at least one of a gaseous form, a liquid form, and a slurry form;
supplying air to an air manifold from an air supply, the air comprising at least oxygen; and
conducting oxygen in an ionic superoxide form through the electrolyte membrane to electrochemically combine the oxygen with the oxidizable fuel to produce electricity;
wherein the electrolyte membrane includes a porous substrate formed by electrically non-conductive particles, an anode catalyst layer deposited along a fuel manifold side of the porous substrate, a cathode catalyst layer deposited along an air manifold side of the porous substrate, and an ionic liquid filling the porous substrate between the anode and cathode catalyst layers.

19. The method of claim 18 wherein the ionic liquid maintains a liquid form, an impedance of less than 1000 Ohm/cm, and a vapor pressure of less than 0.1 psi at operating temperatures ranging from 40° to 200° C.

20. The method of claim 18 wherein the electrolyte membrane is configured to be assembled in the reformer-less fuel cell with an anode electrode disposed in relation to the anode catalyst layer and a cathode electrode disposed in relation to the cathode catalyst layer, the method further comprising:
generating an electrochemical potential across the anode and cathode electrodes and a corresponding current traveling through the anode and cathode electrodes.

21. The method of claim 20, further comprising:
catalyzing a superoxide at the cathode catalyst layer such that a negatively charged ionized form of the superoxide enters the ionic liquid by collecting an electron from the cathode electrode.

22. The method of claim 21, further comprising:
conducting the negatively charged ionized form of the superoxide through the ionic liquid to the anode catalyst layer where it reacts with the oxidizable fuel to generate carbon dioxide and water.

23. The method of claim 18, further comprising:
conducting oxygen in the ionic superoxide form when the reformer-less fuel cell is exposed to operating temperatures below 500° C.

24. The method of claim 18, further comprising:
conducting oxygen in the ionic superoxide form when the reformer-less fuel cell is exposed to operating temperatures below 300° C.

25. The method of claim 18, further comprising:
conducting oxygen in the ionic superoxide form when the reformer-less fuel cell is exposed to operating temperatures ranging from 200° to 300° C.

* * * * *